(12) United States Patent
Simon et al.

(10) Patent No.: US 12,381,729 B2
(45) Date of Patent: Aug. 5, 2025

(54) PROTECTION OF A SECRET KEY

(71) Applicant: STMICROELECTRONICS BELGIUM, Machelen (BE)

(72) Inventors: Thierry Simon, Wezembeek-Oppem (BE); Gilles Van Assche, Woluwe-St-Lambert (BE)

(73) Assignee: STMICROELECTRONICS BELGIUM, Machelen (BE)

( * ) Notice: Subject to any disclaimer, the term of this patent is extended or adjusted under 35 U.S.C. 154(b) by 250 days.

(21) Appl. No.: 18/184,451

(22) Filed: Mar. 15, 2023

(65) Prior Publication Data

US 2023/0299957 A1    Sep. 21, 2023

(30) Foreign Application Priority Data

Mar. 18, 2022 (FR) .................................. FR2202419

(51) Int. Cl.
| | |
|---|---|
| *H04L 29/06* | (2006.01) |
| *G06F 21/00* | (2013.01) |
| *H04L 9/08* | (2006.01) |
| *H04L 9/30* | (2006.01) |

(52) U.S. Cl.
CPC ............ *H04L 9/3066* (2013.01); *H04L 9/085* (2013.01)

(58) Field of Classification Search
CPC ... H04L 9/3066; H04L 9/085; H04L 2209/26; H04L 9/002
See application file for complete search history.

(56) References Cited

U.S. PATENT DOCUMENTS 8,428,252 B1 * 4/2013 Makepeace ........... H04L 9/3066
380/30
8,582,761 B2 * 11/2013 Georgiades ............ G06F 7/725
380/278
(Continued)

FOREIGN PATENT DOCUMENTS

FR            3140728 A1 *  4/2024
WO    WO-2008027089 A2 *  3/2008  ........... G06F 21/556

OTHER PUBLICATIONS

Brown, "SEC 1: Elliptic Curve Cryptography," *Standards for Efficient Cryptography, Certicom Research, Version 2.0*, May 21, 2009. (144 pages).

(Continued)

*Primary Examiner* — Lisa C Lewis
(74) *Attorney, Agent, or Firm* — Seed IP Law Group LLP

(57) ABSTRACT

A device multiplies a first public key by a first scalar value, generating an intermediate result. The first public key corresponds to a point on an elliptic curve of order n, n is an integer, and the first scalar value is equal to n/m where in is a largest prime integer factor of n. The device determines whether the intermediate result is equal to a value corresponding to a point O at infinity on the elliptic curve. In response to the determining indicating the intermediate result is different from the value corresponding to the point O, the device multiplies the intermediate result by a second scalar, generating a shared secret value. The device performs one or more processing operations using the generated shared secret value. Otherwise, the device may initiate error processing without generating the shared secret value.

28 Claims, 4 Drawing Sheets

(56) References Cited

U.S. PATENT DOCUMENTS

| | | | |
|---|---|---|---|
| 2013/0114815 A1* | 5/2013 | Nishimaki | H04L 9/3073 |
| | | | 380/278 |
| 2015/0263854 A1* | 9/2015 | Sakumoto | H04L 9/0869 |
| | | | 380/44 |
| 2018/0191503 A1* | 7/2018 | Alwar | H04L 9/3242 |
| 2022/0021526 A1* | 1/2022 | Dugardin | H04L 9/3073 |

OTHER PUBLICATIONS

Kaliski Jr., "Compatible cofactor multiplication for Diffie-Hellman primitives," 2 *Electronics Letters* 34(25), Dec. 10, 1998. (2 pages).

\* cited by examiner

PROTECTION OF A SECRET KEY

BACKGROUND

Technical Field

The present disclosure generally concerns the field of cryptography, and in particular a method and a device enabling to protect the value of a private key used for elliptic curve cryptography operations.

Description of the Related Art

Elliptic curve cryptography methods are well adapted to asymmetric cryptography methods since they enable to use cryptographic keys of small size. For example, elliptic curve cryptography methods may be used to implement a cipher, key exchange, key agreement, digital signature or authentication operation between two devices.

However, when a public key, transmitted by one of the two devices, is a point in the used elliptic curve having an order smaller than or equal to the cofactor of the curve, there is a risk for the third party transmitting this public key to be able to deduce, from the result of the cryptographic operation or from the observation of the physical effects of the cryptographic calculation after a side channel attack, at least partially the value of the secret key of the other device.

BRIEF SUMMARY

In an embodiment, a first processing device receives a first public key. The first public key corresponds to a point on an elliptic curve of order n, where n is an integer. The first processing device multiples the first public key by a first scalar value. The first scalar value is equal to n/m where m is a largest prime integer factor of n. The multiplying of the first public key by the first scalar value generates an intermediate result. The first processing device determines whether the intermediate result is equal to a value corresponding to a point O at infinity on the elliptic curve. In response to the determining indicating the intermediate result is different from the value corresponding to the point O at infinity on the elliptic curve, the first processing devices multiplies the intermediate result by a second scalar. The multiplying the intermediate result by the second scalar generates a shared secret value. The first processing device performs one or more processing operations using the generated shared secret value. In an embodiment, in response to the determining indicating the intermediate result is equal to the value corresponding to the point O at infinity on the elliptic curve, the first processing device initiates error processing without generating the shared secret value.

In an embodiment, a device comprises processing circuitry and a memory coupled to the processing circuitry. The processing circuitry, in operation, multiplies a first public key by a first scalar value. The first public key corresponds to a point on an elliptic curve of order n, where n is an integer, and the first scalar value is equal to n/m where m is a largest prime integer factor of integer n. The multiplying of the first public key by the first scalar value generates an intermediate result. The processing circuitry determines whether the intermediate result is equal to a value corresponding to a point O at infinity on the elliptic curve. In response to the determining indicating the intermediate result is different from the value corresponding to the point O at infinity on the elliptic curve, the processing circuitry multiplies the intermediate result by a second scalar. The multiplying the intermediate result by the second scalar generates a shared secret value. The processing circuitry performs one or more processing operations using the generated shared secret value. In an embodiment, the processing circuitry, in operation: in response to the determining indicating the intermediate result is equal to the value corresponding to the point O at infinity on the elliptic curve, initiates error processing without generating the shared secret value.

In an embodiment, a system comprises a first processing device and a second processing device communicatively coupled to the first processing device. The first processing device, in operation multiplies a first public key received from the second processing device by a first scalar value. The first public key corresponds to a point on an elliptic curve of order n, where n is an integer, and the first scalar value is equal to n/m where m is a largest prime integer factor of integer n. The multiplying of the first public key by the first scalar value generates an intermediate result. The first processing device determines whether the intermediate result is equal to a value corresponding to a point O at infinity on the elliptic curve. In response to the determining indicating the intermediate result is different from the value corresponding to the point O at infinity on the elliptic curve, the first processing device multiplies the intermediate result by a second scalar. The multiplying the intermediate result by the second scalar generates a shared secret value. The first processing device performs one or more processing operations using the generated shared secret value. In an embodiment, the first processing device, in operation: in response to the determining indicating the intermediate result is equal to the value corresponding to the point O at infinity on the elliptic curve, initiates error processing without generating the shared secret value.

In an embodiment, a non-transitory computer-readable medium's contents cause a first processing device to perform a method, the method comprising: receiving, from a second processing device, a first public key, the first public key corresponding to a point on an elliptic curve of order n, where n is an integer; multiplying the first public key by a first scalar value, where the first scalar value is equal to n/m and m is a largest prime integer factor of n, the multiplying of the first public key by the first scalar value generating an intermediate result; determining whether the intermediate result is equal to a value corresponding to a point O at infinity on the elliptic curve; and in response to the determining indicating the intermediate result is different from the value corresponding to the point O at infinity on the elliptic curve: multiplying the intermediate result by a second scalar, the multiplying the intermediate result by the second scalar generating a shared secret value; and performing one or more processing operations using the generated shared secret value. In an embodiment, the method comprises: in response to the determining indicating the intermediate result is equal to the value corresponding to the point O at infinity on the elliptic curve, initiating error processing without generating the shared secret value.

BRIEF DESCRIPTION OF THE SEVERAL VIEWS OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Figure 1:
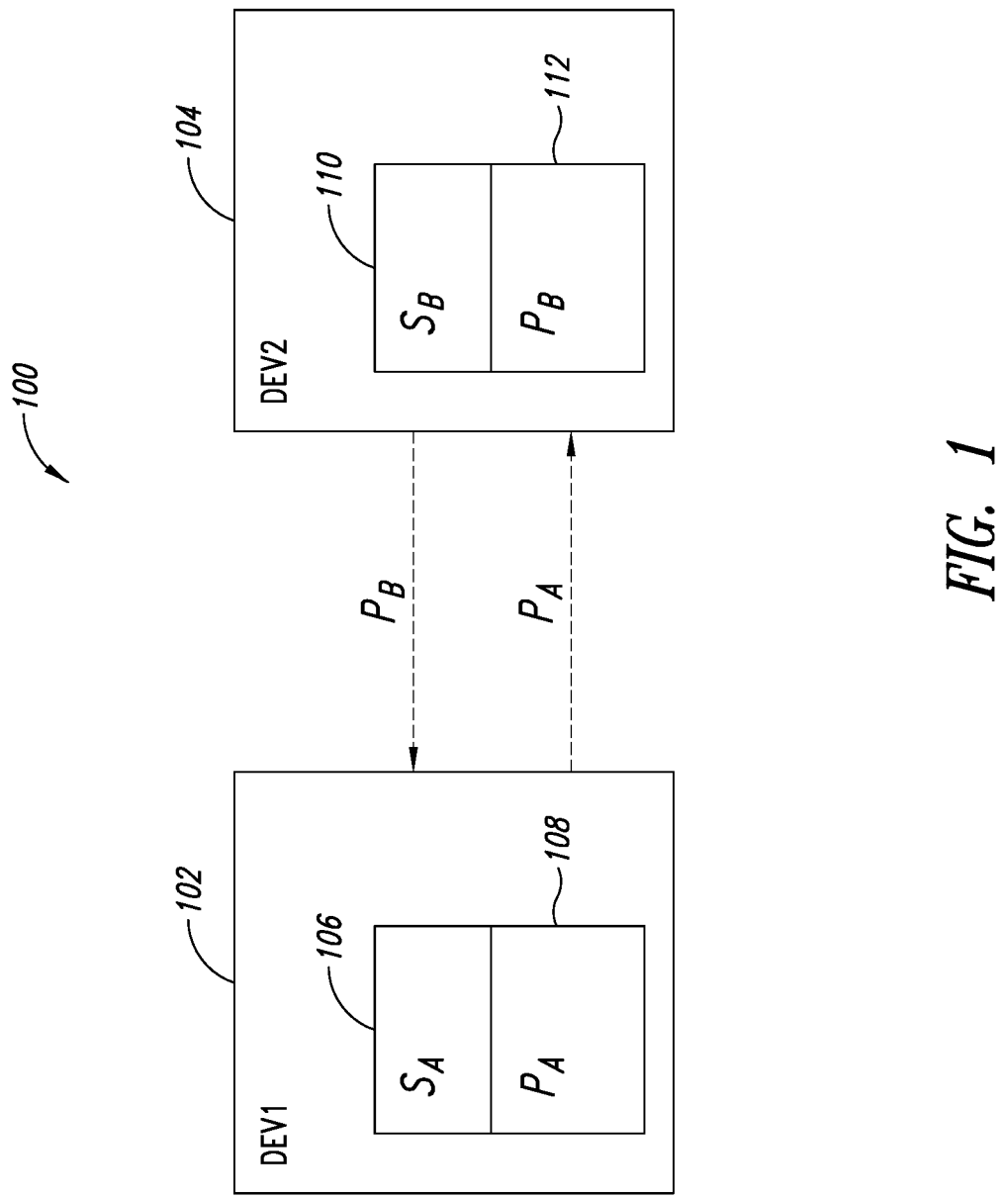
FIG. 1 very schematically shows in the form of blocks a system comprising two devices configured to communicate public keys between each other.

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the properties of elliptic curves, and in particular the properties of the different types of elliptic curves used in cryptography (such as Edwards curves, Weierstrass, Montgomery curves, etc.) are known by those skilled in the art and are not described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

In the present disclosure, the following terms are used with the following definitions: the order of an elliptic curve is an integer, designated by letter n in the rest of the description, describing the number of points forming the elliptic curve;

the cofactor of the curve, designated by letter c in the rest of the description, corresponds to integer n/m, where m is the largest prime integer factor of integer n. In certain cases, cofactor c is equal to 1;

the neutral element of the elliptic curve, also called point at infinity, is a point, designated by letter O, belonging to the elliptic curve and such that for any point P in the curve, $P \oplus O = O \oplus P = P$, where operator $\oplus$ designates the group operation, generally called addition, on the elliptic curve;

the multiplication of a point P of the elliptic curve by a scalar k, noted [k]P in the rest of the description, corresponds to k-1 successive applications of operator $\oplus$ to point P. As an example, $[2]P = P \oplus P$;

a point P of the elliptic curve and different from the point at infinity is said to be of low order if the multiplication of point P by cofactor c results in the point at infinity O of the elliptic curve, in other words if $[c]P = O$. An elliptic curve only admits points of low order if its cofactor c is different from 1 (e.g., Montgomery curves and Edwards curves, which are becoming more popular, may have a cofactor c that is a multiple of 4);

the multiplicative inverse of cofactor c modulo m is a positive integer u smaller than m such that product cu is equal to 1 modulo m.

FIG. 1 very schematically shows in the form of blocks a system 100 comprising two devices 102 (DEV1) and 104 (DEV2) configured to communicate public data between each other.

As an example, device 102 comprises a memory (not illustrated in FIG. 1), for example, a non-volatile memory, having a secret key 106 ($S_A$) and a public key 108 ($P_A$) stored therein. On its side, device 104 for example also comprises a memory having another secret key 110 ($S_B$) and another public key 112 ($P_B$) stored therein. In particular, the two public keys 108 and 112 each represent a point of a sub-group of order m of an elliptic curve of order n. The elliptic curve used is for example an Edwards curve, a Weierstrass curve, a Montgomery curve, etc. The two secret keys 106 and 110 are for example scalars coded over a number N of bits, where N is an integer.

Each of the two devices 102 and 104 are further configured to exchange, according to a Diffie-Hellman key exchange, public keys 108 and 112. For this purpose, the two devices are for example configured to communicate over a secure, or non-secure, channel. As an example, the communication is a wired communication, and the public key exchange is for example performed via a cable coupling an interface of one of the devices to an interface of the other device. As an example, the cable coupling the two devices 102 and 104 is a USB cable or an Ethernet cable, an optical fiber, an asymmetric digital subscriber line (ADSL), etc. In other examples, the two devices communicate in wireless fashion, such as for example by near field communication technology (NFC), by Bluetooth® communication technology, or by WI-FI® communication technology, etc. It is also possible for devices 102, 104 to communicate over a plurality of wire and/or wireless links, and/or over one or a plurality of intermediate networks, such as the Internet. As an example, the exchange of public keys 108 and 112 between devices 102 and 104 is performed over a secure channel, that is, after the two devices 102 and 104 have authenticated to each other. Conversely to public keys 108 and 112, private keys 106 and 110 are specific to each of devices 102 and 104 and should remain unknown and inaccessible for the other device.

The two devices 102 and 104 are for example further configured to perform cryptographic operations on the elliptic curve to generate a shared secret S, such as for example a cipher or decipher key, from the received public key and from the secret key which is specific thereto. In other words, device 102 generates shared secret S from public key $P_B$ and from secret key $S_A$ and device 104 generates the same shared secret from public key $P_A$ and from private key $S_B$.

As an example, shared secret S is obtained by device 102 by performing multiplication $[S_A] P_B$ and this same shared secret S is obtained by device 104 by performing multiplication $[S_B]$PA.

It is desirable for the value of scalar $S_A$ not to be able to be known, even only partly, outside of device 102 and in particular by device 104. However, an attack may be conducted by the holder of device 104 when point $P_B$ is of low order. For example, such an attack is described in publication "A Key Recovery Attack on Discrete Log-based Schemes Using a Prime Order SubGroup" of Chae Hoon Lim, Pil Joong Lee. In this case, secret $S=[S_A]P_B$ belongs to set $\{O, P_B, \ldots, [c-1]P_B\}$. Depending on the use of shared secret S in the rest of the protocol, an extensive search is possible and enables to recover shared secret S as well as scalar $k \in \{0, \ldots, c-1\}$ such that $S=[k]P_B$. It is then possible to at least partially deduce the value of scalar $S_A$, since the value of scalar $S_A$ is equal to k modulo c. Further, the attack may be combined with a side channel attack, enabling the holder of device 104 to observe, during the calculation of shared secret S by device 102, at what times the point at infinity O is obtained as an intermediate result during scalar multiplication $S=[S_A]P_B$ and to deduce therefrom, at least partially, or entirely, the value of scalar $S_A$.

Figure 2:
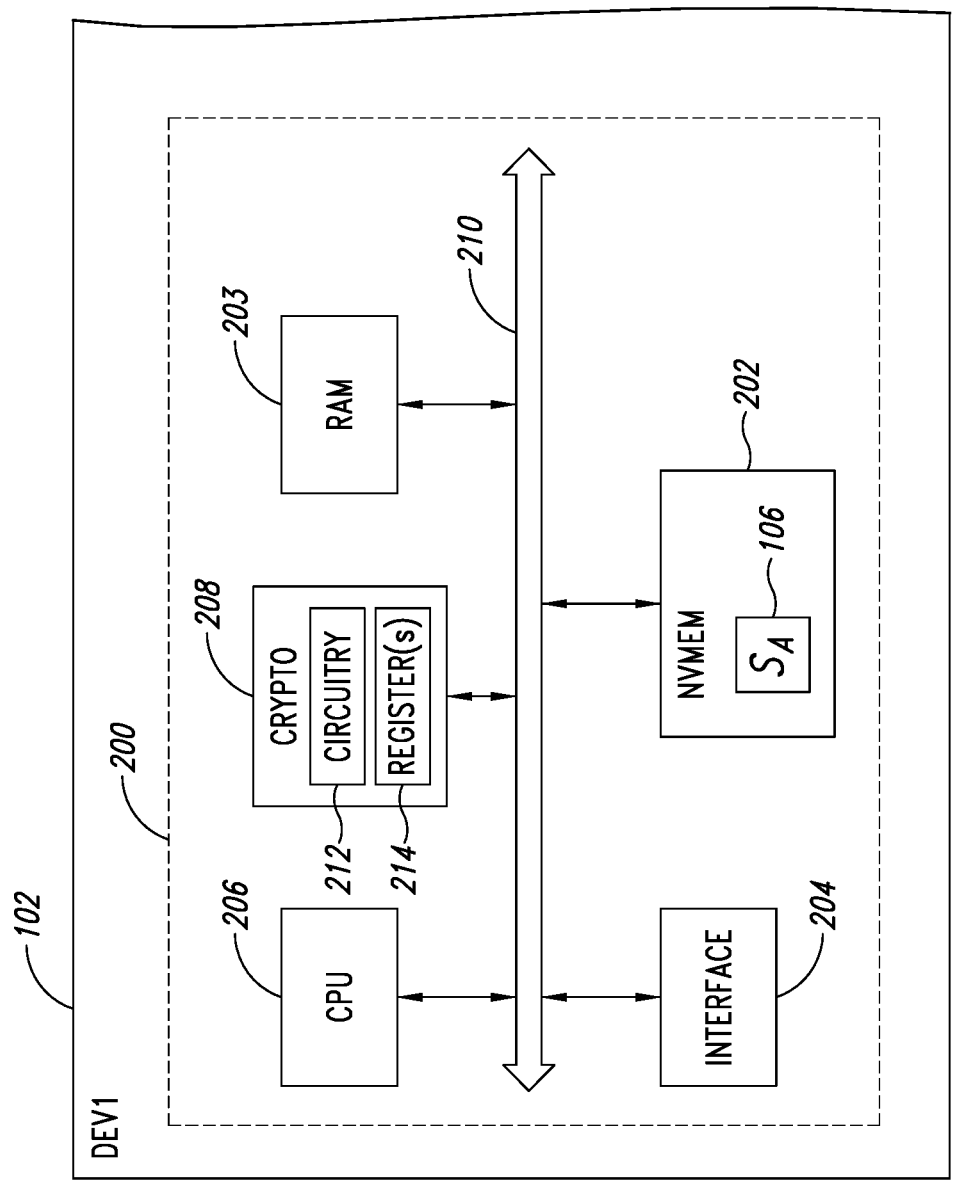
FIG. 2 very schematically shows in the form of blocks an embodiment of one of the two devices shown in FIG. 1.

FIG. 2 very schematically shows in the form of blocks an embodiment of the device 102 (DEV1) shown in FIG. 1. An embodiment of the device 104 of FIG. 1 may be similar or identical to the embodiment of the device 102 shown in FIG. 2.

Electronic device 102 is for example an electronic board such as a microcircuit card, computer equipment, a microprocessor circuit, etc.

Device 102 comprises an integrated circuit 200 comprising a non-volatile memory 202 (NV MEM) having for example private key 106 ($S_A$) stored therein, as well as a volatile memory 203 (RAM). Private key $S_A$ for example represents a scalar coded over a number N of bits. Integrated circuit 200 further comprises an interface 204, for example configured to establish a wired or wireless connection with device 104, a generic processor 206 (CPU), as well as a cryptographic processor 208 (CRYPTO). Memories 202 and 203, as well as interface 204 and processors 208 and 206, are for example coupled together via a bus 210, for example comprising a data bus.

As an example, interface 204 is configured to receive public key 112, transmitted by device 104, and to transmit it, via bus 210, to cryptographic processor 208, where it is for example stored in one or a plurality of registers 214. Public key 112 is a point $P_B$ of the sub-group defined upstream. Cryptographic processor 208 is configured to receive secret key 106 from non-volatile memory 202 via bus 210.

Cryptographic processor 208 is for example configured to perform a cryptographic operation, such as a scalar multiplication, on the elliptic curve having point $P_B$ belonging thereto to generate shared secret S based on public key 112 and on secret key 106, for example cryptographic operation $S=[S_A]P_B$. As an example, shared secret S is a cipher or decipher key. Cryptographic processor 208, for example, comprises processing circuitry 212 and memory, as illustrated one or more registers 214.

In the applications targeted by the present disclosure, device 102, and more particularly cryptographic processor 208, is then further configured for the implementation of an algorithm to decrease the risk for a possible attacker to be able to obtain, at least partly, the value of scalar SA by sending as a public key 112 a point $P_B$ of low order.

Figure 3:
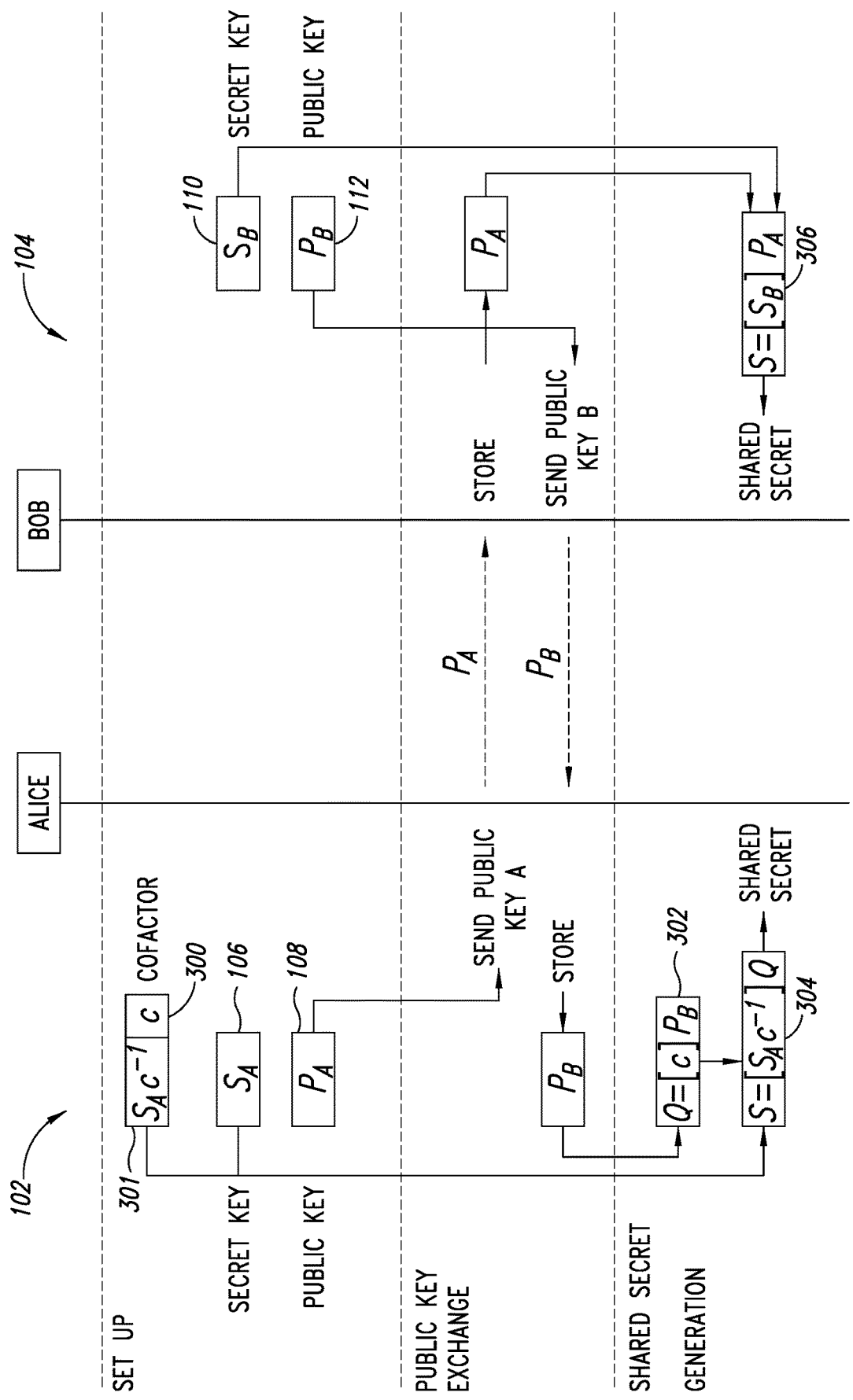
FIG. 3 illustrates a method of generation of a shared secret according to an embodiment of the present disclosure.

FIG. 3 illustrates a method of generation of a shared secret by device 102 and of the same shared secret by device 104, according to an embodiment of the present disclosure.

In particular, on the left-hand side of FIG. 3 (device 102 is conceptually illustrated as being used by user ALICE) are illustrated steps of exchange of Diffie-Hellman keys between devices 102 and 104 and of generation of the shared secret (SHARED SECRET) by device 102. The cryptographic processor 208 of device 102 is for example configured for the implementation of a protection algorithm according to an embodiment of the present disclosure. On the right-hand side of FIG. 3 (device 104 is conceptually illustrated as being used by user BOB) are illustrated steps of exchange of Diffie-Hellman keys between devices 102 and 104 and of generation of the shared secret (SHARED SECRET) by device 104. The method implemented by the device 104 illustrated in FIG. 3 for example does not comprise the implementation of the protection algorithm, although it is quite possible for device 104 to also be configured for the implementation of the protection methods described herein or other protection methods.

At a step SET UP for example occurring during the manufacturing of device 102, values 300 (COFACTOR) and 301 ($S_A c^{-1}$), secret key 106 (SECRET KEY) $S_A$, and public key 108 (PUBLIC KEY) $P_A$ are stored, for example in non-volatile memory 202. Value 300 corresponds to value c of the cofactor of the elliptic curve. Value c is equal to n/m, where n is the order of the elliptic curve and m is the largest prime factor of integer n. In another example, these values are stored after the manufacturing, for example, during a step of customization of device 102.

According to an embodiment, value 301 is a value $S_A c^{-1}$ corresponding to the product modulo m of private key $S_A$ by a value of the multiplicative inverse $S_A$ modulo m of the cofactor. As an example, according to this embodiment, secret key $S_A$ (106) is not stored in a memory of device 102, since value $S_A c^{-1}$ is sufficient.

According to another embodiment, value 301 is only the value of the multiplicative inverse $c^{-1}$ modulo m of the cofactor.

On the side of device 104, in an embodiment only private key 110 $S_B$ and public key 112 $P_B$ are stored, for example in a memory of device 104, during this step SET UP.

The public key exchange occurs at a step PUBLIC KEY EXCHANGE. Device 102 transmits public key 108 (SEND PUBLIC KEY A) to device 104 and device 104 transmits public key 112 (SEND PUBLIC KEY B) to device 102. Each of devices 102 and 104 stores the key that it has received (STORE), for example in a register of their cryptographic processor.

After the key exchange, the method continues at a step of generation of the shared secret (SHARED SECRET GENERATION). On the side of device 102, values 300 and 301, as well as private key 106, are for example transmitted to registers of cryptographic processor 208. On the side of device 104, secret key 110 is for example transmitted to a register of the cryptographic processor.

Cryptographic processor 208 is configured to perform the multiplication of public key $P_B$ by cofactor c. The value resulting from this multiplication is an intermediate value Q 302. In other words, intermediate value Q is equal to $[c]P_B$. Cryptographic processor 208 is configured to then perform the multiplication of intermediate value Q by a scalar k to generate a shared secret S 304. As an example, when value 301 is equal to $S_A c^{-1}$ modulo m, scalar k is value 301. In another example, when value 301 is equal to $c^{-1}$ modulo m, scalar k is calculated, for example, by cryptographic processor 208, by performing product $k=S_A c^{-1}$ modulo m. Shared secret S is then equal to $[S_A c^{-1}]Q$ and thus to $[S_A]P_B$. In an embodiment, the value of the cofactor c is independent of the value of the private key $S_A$. Hence, the intermediary value Q does not depend on the value of the private key $S_A$ and does not contain any information on its value. Hence, neither the value of the cofactor c, nor the intermediary value Q, contain any information on the value of the private key $S_A$. In other words, shared secret S is equal to the multiplication of public key $P_B$ by private key $S_A$.

According to an embodiment, the value of private key $S_A$ is selected to be a multiple of cofactor c. In this case, scalar k may be obtained by calculating the Euclidean division of $S_A$ by cofactor c, which is an integer. Scalar k is then coded over a number of bits proportional to $\log_2(m/c)$.

In the case where public key $P_B$ is a point of low order, then intermediate value Q is the point at infinity O of the elliptic curve. As an example, in this case, cryptographic processor does not carry on the generation of the shared secret and stops the process.

As an illustration, on the side of device 104, a shared secret 306 is directly obtained by the multiplication of public key PA by secret key $S_B$.

Figure 4:
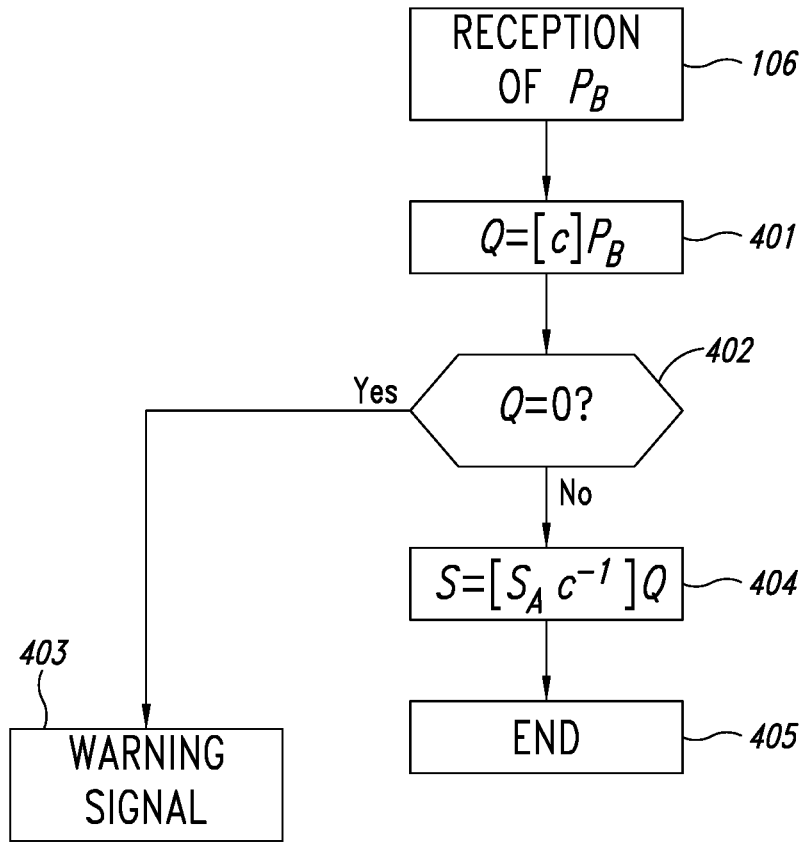
FIG. 4 is a flowchart showing operations of a method of protection of a secret key according to an embodiment of the present disclosure.

FIG. 4 is a flowchart showing operations of a method of protection of secret key $S_A$, implemented by device 102 and for example by the cryptographic processor 208 of device 102, according to an embodiment of the present disclosure.

At a step 400 (RECEPTION OF $P_B$), device 102 receives, for example, from device 104, public key $P_B$, public key $P_B$ being a point in the elliptic curve.

At a step 401 (Q=[c]$P_B$), cryptographic processor 208 is configured to perform the multiplication of public key $P_B$ by the cofactor c of the elliptic curve. As an example, private key $S_A$ is transmitted to cryptographic processor 208 via bus 210. The multiplication results in an intermediate value Q, which is compared with the value of the point at infinity O at a step 402 (Q=0?). As an example, the value of the point at infinity is stored in a memory of device 102, for example on manufacturing of device 102.

If intermediate value Q corresponds to the value of the point at infinity O (branch Y), then the method continues at a step 403 (WARNING SIGNAL) where cryptographic processor 208 is for example configured to stop the process of generating the shared secret S, to transmit a warning signal to generic processor 206, etc., and various combinations thereof. As an example, generic processor 206 is configured to deploy countermeasures on reception of this signal, for example aiming at protecting the integrity of critical data of device 102 and in particular private key SA (e.g., terminating communication with the device 104, rejecting a request to authenticate device 104, rebooting device 102, etc., and various combinations thereof). In an embodiment, the computation of the intermediary value Q is independent of the value of the private key $S_A$. Hence, if the intermediary value Q corresponds to the value of the point at infinity O, the value of the private key SA may not be used in the computations made in the method.

In the case where intermediate data Q does not correspond to the value of the point at infinity (branch N), the method carries on at a step 404 (Q=[$S_A c^{-1}$]Q). During step 404, intermediate value Q is used by the cryptographic processor to calculate the value of shared secret S. At step 404, value Q is multiplied by value $S_A C^{-1}$ modulo m to generate the shared secret. The obtained value corresponds to the multiplication of public key $P_B$ by private key $S_A$. In an example, value $S_A c^{-1}$ modulo m is entirely stored in a memory of device 102. In another example, only value $c^{-1}$ modulo m is stored and product $S_A c^{-1}$ modulo m is calculated, for example by cryptographic processor 208.

Once shared secret S has been obtained, the method ends at a step 405 (END) where the secret is for example used by device 102. For example, one or more operations of an application executing on processor 206 (e.g., banking applications, streaming applications, etc.) may be performed using the shared secret S, device 2 may be authenticated based on the shared secret (e.g., a printer cartridge, SIM card, etc., may be authenticated), etc., and various combinations thereof.

An advantage of the described embodiments is that they may be applicable on all elliptic curves whatever the value of their cofactor.

Still another advantage of the described embodiments is that the shared secret can be generated by a simple multiplication of value Q by a scalar.

Another advantage of the described embodiments is that if a fault is injected into multiplication Q=[c]$P_B$ to hide the fact that point $P_B$ is of low order, the shared secret will be incorrect, in other words different from [$S_A$]$P_B$. The attacker can accordingly not use the value of the generated secret to deduce therefrom information relative to the value of private key $S_A$. Further, the obtained intermediate result, being faulty, risks no longer being a point of low order, which makes the side channel attack impossible to achieve.

Another advantage of the described embodiments is, in the case where the comparison of Q with the point at infinity is faulty, the point at infinity will be obtained as an intermediate result Q. During the calculation of shared secret S as a multiplication of the intermediate result by a scalar, the point at infinity will be obtained at each step of the calculation whatever the value of the scalar and thus independently from the value of private key $S_A$. In particular, the side channel attack can also no longer be achieved.

Various embodiments and variants have been described. Those skilled in the art will understand that certain features of these various embodiments and variants may be combined, and other variants will occur to those skilled in the art. In particular, other integrated circuit configurations than the circuit disclosed in FIG. 2 enable to implement the methods described in relation with FIGS. 3 and 4. For example, although the circuit of FIG. 2 comprises a cryptographic processor 208, in other embodiments, the cryptographic processing described herein may be performed by generic processor 206 or by another processor.

Finally, the practical implementation of the described embodiments and variants is within the abilities of those skilled in the art based on the functional indications given hereabove. In particular, as concerns the selection of value 301.

An embodiment provides a method of generation of a secret shared between a first device and a second device comprising:

the reception, by the first device and from the second device, of a first public key;

a first multiplication, by a cryptographic circuit of the first device, of the first public key by a first scalar, the first multiplication resulting in an intermediate result;

the determination of whether the intermediate result is equal to the value of a point O; and if the intermediate result is different from the value of point O, a second multiplication, by the cryptographic circuit, of the intermediate result by a second scalar, resulting in the shared secret, the first public key being a point of an elliptic curve of order n, the first scalar being equal to n/m, where m is the largest prime integer factor of n, and point O being the point at infinity of the elliptic curve.

According to an embodiment, the above method further comprises, if it is determined that the intermediate result is equal to the point at infinity O: the transmission, to a generic processor of the first device, of a warning signal.

According to an embodiment, the second scalar is equal to $S_A c^{-1}$ modulo m, where $S_A$ is an integer defining a private key of the first device and $c^{-1}$ is the multiplicative inverse of first scalar c modulo m.

According to an embodiment, value $c^{-1}$ modulo m is stored in a non-volatile memory of the first device, the method further comprising the multiplication modulo m of value $c^{-1}$ by private key $S_A$ to generate the second scalar.

According to an embodiment, the second scalar is stored in a non-volatile memory of the first device.

According to an embodiment, integer $S_A$ is a multiple of the first scalar.

According to an embodiment, the first scalar is the cofactor of the elliptic curve.

According to an embodiment, the elliptic curve is an Edwards curve.

According to an embodiment, the elliptic curve is a Weierstrass curve.

According to an embodiment, the elliptic curve is a Montgomery curve.

An embodiment provides a first device comprising a cryptographic processor configured to:

perform a first multiplication of a first public key, transmitted by a second device, by a first scalar, resulting in an intermediate result;

determine whether the intermediate result is equal to the value of a point O; and if the intermediate result is different from the value of point O, perform a second multiplication of the intermediate result by a second scalar, resulting in a shared secret, the first public key being a point of an elliptic curve of order n, the first scalar being equal to n/m, where m is the largest prime integer factor of n, and point O being the point at infinity of the elliptic curve.

According to an embodiment, the above first device is further configured for, if it is determined that the intermediate result is equal to the value of the point at infinity O: the transmission, to a generic processor of the first device, of a warning signal; the performing of a countermeasure by the generic processor.

An embodiment provides a system comprising the first above device and the second device configured to communicate together.

In an embodiment, a method of generating a shared secret (S) between a first device and a second device (102, 104) comprises: the reception, by the first device from the second device, of a first public key ($P_B$); a first multiplication, by a cryptographic circuit (208) of the first device, of the first public key by a first scalar (c), the first multiplication resulting in an intermediate result (Q);

the determination of whether the intermediate result is equal to the value of a point O; and only if the intermediate result is different from the value of point O, performing a second multiplication of the intermediate result by a second scalar (k), resulting in a shared secret, the first public key being a point of an elliptic curve of order n, the first scalar being equal to n/m, where m is the largest prime integer factor of n, and the point O being the point at infinity of the elliptic curve.

In an embodiment, the method comprises, responding to a determination that the intermediate result (Q) is equal to the point at infinity O by transmitting, to a generic processor (206) of the first device (102), a warning signal.

In an embodiment of the method, the second scalar (k) depends on the value of a private key ($S_A$) of the first device and the first scalar (c) does not depend on the value of said private key, the intermediary value (Q) containing no information on the private key.

In an embodiment of the method, the second scalar (k) is equal to $S_A c^{-1}$ modulo m, where $S_A$ is an integer defining the private key of the first device and $c^{-1}$ is the multiplicative inverse of first scalar c modulo m.

In an embodiment, a method comprises: receiving, by a first processing device, a first public key, the first public key corresponding to a point on an elliptic curve of order n, where n is an integer; multiplying, by the first processing device, the first public key by a first scalar value, where the first scalar value is equal to n/m and m is a largest prime integer factor of n, the multiplying of the first public key by the first scalar value generating an intermediate result; determining, by the first processing device, whether the intermediate result is equal to a value corresponding to a point O at infinity on the elliptic curve; and in response to the determining indicating the intermediate result is different from the value corresponding to the point O at infinity on the elliptic curve: multiplying, by the first processing device, the intermediate result by a second scalar, the multiplying the intermediate result by the second scalar generating a shared secret value; and performing, by the first processing device, one or more processing operations using the generated shared secret value.

In an embodiment, the method comprises: in response to the determining indicating the intermediate result is equal to the value corresponding to the point O at infinity on the elliptic curve, initiating error processing without generating the shared secret value. In an embodiment, the determining whether the intermediate result is equal to a value corresponding to a point O at infinity on the elliptic curve is performed by cryptographic circuitry of the first processing device and the initiating error processing comprises sending an error message to a host processor of the first processing device.

In an embodiment, the second scalar is equal to $S_A c^{-1}$ modulo m, where $S_A$ is an integer defining a private key of the first device and $c^{-1}$ is a multiplicative inverse of the first scalar modulo m. In an embodiment, a value equal to $c^{-1}$ modulo m is stored in a non-volatile memory of the first processing device, and the method comprises: multiplying the stored value equal to $c^{-1}$ modulo m by the integer $S_A$ defining the private key, the multiplying the stored value equal to $c^{-1}$ modulo m by the integer $S_A$ generating the second scalar.

In an embodiment, the second scalar is stored in a non-volatile memory of the first processing device. In an embodiment, the integer $S_A$ is a multiple of the first scalar. In an embodiment, the first scalar is a cofactor of the elliptic curve. In an embodiment, the elliptic curve is an Edwards curve. In an embodiment, the elliptic curve is a Weierstrass curve. In an embodiment, the elliptic curve is a Montgomery curve.

In an embodiment, a device comprises processing circuitry and a memory coupled to the processing circuitry. The processing circuitry, in operation: multiplies a first public key by a first scalar value, where the first public key corresponds to a point on an elliptic curve of order n, where n is an integer, and the first scalar value is equal to n/m where m is a largest prime integer factor of integer n, the multiplying of the first public key by the first scalar value generating an intermediate result; determines whether the intermediate result is equal to a value corresponding to a point O at infinity on the elliptic curve; and in response to the determining indicating the intermediate result is different from the value corresponding to the point O at infinity on the elliptic curve: multiplies the intermediate result by a second scalar, the multiplying the intermediate result by the second scalar generating a shared secret value; and performs one or more processing operations using the generated shared secret value.

In an embodiment, the processing circuitry, in operation: in response to the determining indicating the intermediate result is equal to the value corresponding to the point O at infinity on the elliptic curve, initiates error processing without generating the shared secret value. In an embodiment, the processing circuitry comprises a host processor and a cryptographic processor, the determining whether the intermediate result is equal to a value corresponding to a point O at infinity on the elliptic curve is performed by the cryptographic processor, and the initiating error processing comprises sending an error message to the host processor. In an embodiment, the second scalar is equal to $S_A c^{-1}$ modulo m, where $S_A$ is an integer defining a private key of the device and $c^{-1}$ is a multiplicative inverse of the first scalar modulo m. In an embodiment, a value equal to $c^{-1}$ modulo m is stored in a non-volatile portion of the memory, and the processing circuitry, in operation: multiplies the stored value equal to $c^{-1}$ modulo m by the integer $S_A$ defining the private key, the multiplying the stored value equal to $c^{-1}$ modulo m by the integer SA generating the second scalar. In an embodiment, the second scalar is stored in a non-volatile portion of the memory. In an embodiment, the integer $S_A$ is a multiple of the first scalar. In an embodiment, the first scalar is a cofactor of the elliptic curve. In an embodiment, the elliptic curve is: an Edwards curve; a Weierstrass curve; or a Montgomery curve. In an embodiment, the device comprises a cryptographic processor including the processing circuitry and the memory, wherein the memory comprises one or more memory registers.

In an embodiment, a system comprises a first processing device and a second processing device communicatively coupled to the first processing device. The first processing device, in operation: multiplies a first public key received from the second processing device by a first scalar value, where the first public key corresponds to a point on an elliptic curve of order n, where n is an integer, and the first scalar value is equal to n/m where m is a largest prime integer factor of integer n, the multiplying of the first public key by the first scalar value generating an intermediate result; determines whether the intermediate result is equal to a value corresponding to a point O at infinity on the elliptic curve; and in response to the determining indicating the intermediate result is different from the value corresponding to the point O at infinity on the elliptic curve: multiplies the intermediate result by a second scalar, the multiplying the intermediate result by the second scalar generating a shared secret value; and performs one or more processing operations using the generated shared secret value. In an embodiment, the first processing device, in operation: in response to the determining indicating the intermediate result is equal to the value corresponding to the point O at infinity on the elliptic curve, initiates error processing without generating the shared secret value. In an embodiment, the first processing device comprises a wireless communication interface; the second processing device comprises a wireless communication interface; the first processing device, in operation, is wirelessly coupled to the second processing device via a wireless communication link; and the first processing device, in response to the determining indicating the intermediate result is equal to the value corresponding to the point O at infinity on the elliptic curve, terminates the wireless communication link. In an embodiment, the one or more processing operations comprise an authentication operation to authenticate the second processing device.

In an embodiment, a non-transitory computer-readable medium's contents cause a first processing device to perform a method, the method comprising: receiving, from a second processing device, a first public key, the first public key corresponding to a point on an elliptic curve of order n, where n is an integer; multiplying the first public key by a first scalar value, where the first scalar value is equal to n/m and m is a largest prime integer factor of n, the multiplying of the first public key by the first scalar value generating an intermediate result; determining whether the intermediate result is equal to a value corresponding to a point O at infinity on the elliptic curve; and in response to the determining indicating the intermediate result is different from the value corresponding to the point O at infinity on the elliptic curve: multiplying the intermediate result by a second scalar, the multiplying the intermediate result by the second scalar generating a shared secret value; and performing one or more processing operations using the generated shared secret value. In an embodiment, the method comprises: in response to the determining indicating the intermediate result is equal to the value corresponding to the point O at infinity on the elliptic curve, initiating error processing without generating the shared secret value. In an embodiment, the contents comprise instructions executed by processing circuitry of the first processing device.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving, by a first processing device, a first public key, the first public key corresponding to a point on an elliptic curve of order n, where n is an integer;
multiplying, by the first processing device, the first public key by a first scalar value, where the first scalar value is equal to n/m and in is a largest prime integer factor of n, the multiplying of the first public key by the first scalar value generating an intermediate result;

determining, by the first processing device, whether the intermediate result is equal to a value corresponding to a point O at infinity on the elliptic curve; and in response to the determining indicating the intermediate result is different from the value corresponding to the point O at infinity on the elliptic curve:

multiplying, by the first processing device, the intermediate result by a second scalar, the multiplying the intermediate result by the second scalar generating a shared secret value; and performing, by the first processing device, one or more processing operations using the generated shared secret value.

2. The method according to claim 1, comprising:

in response to the determining indicating the intermediate result is equal to the value corresponding to the point O at infinity on the elliptic curve, initiating error processing without generating the shared secret value.

3. The method of claim 2, wherein the determining whether the intermediate result is equal to a value corresponding to a point O at infinity on the elliptic curve is performed by cryptographic circuitry of the first processing device and the initiating error processing comprises sending an error message to a host processor of the first processing device.

4. The method according to claim 1, wherein the second scalar is equal to $S_A c^{-1}$ modulo m, where $S_A$ is an integer defining a private key of the first device and $c^{-1}$ is a multiplicative inverse of the first scalar value modulo m.

5. The method according to claim 4, wherein the integer SA is a multiple of the first scalar.

6. The method according to claim 4 wherein a value equal to $c^{-1}$ modulo in is stored in a non-volatile memory of the first processing device, and the method comprises:

multiplying the stored value equal to $c^{-1}$ modulo in by the integer $S_A$ defining the private key, the multiplying the stored value equal to $c^{-1}$ modulo in by the integer SA generating the second scalar.

7. The method according to claim 1, wherein the second scalar is stored in a non-volatile memory of the first processing device.

8. The method according to claim 1, wherein the first scalar is a cofactor of the elliptic curve.

9. The method according to claim 1, wherein the elliptic curve is an Edwards curve.

10. The method according to claim 1, wherein the elliptic curve is a Weierstrass curve.

11. The method according to claim 1, wherein the elliptic curve is a Montgomery curve.

12. A device, comprising:

processing circuitry; and a memory coupled to the processing circuitry, wherein the processing circuitry, in operation:

multiplies a first public key by a first scalar value, where the first public key corresponds to a point on an elliptic curve of order n, where n is an integer, and the first scalar value is equal to n/m where in is a largest prime integer factor of integer n, the multiplying of the first public key by the first scalar value generating an intermediate result;

determines whether the intermediate result is equal to a value corresponding to a point O at infinity on the elliptic curve; and in response to the determining indicating the intermediate result is different from the value corresponding to the point O at infinity on the elliptic curve:

multiplies the intermediate result by a second scalar, the multiplying the intermediate result by the second scalar generating a shared secret value; and performs one or more processing operations using the generated shared secret value.

13. The device according to claim 12, wherein the processing circuitry, in operation:

in response to the determining indicating the intermediate result is equal to the value corresponding to the point O at infinity on the elliptic curve, initiates error processing without generating the shared secret value.

14. The device of claim 13, wherein the processing circuitry comprises a host processor and a cryptographic processor, the determining whether the intermediate result is equal to a value corresponding to a point O at infinity on the elliptic curve is performed by the cryptographic processor, and the initiating error processing comprises sending an error message to the host processor.

15. The device according to claim 12, wherein the second scalar is equal to $S_A c^{-1}$ modulo m, where $S_A$ is an integer defining a private key of the device and $c^{-1}$ is a multiplicative inverse of the first scalar value modulo m.

16. The device according to claim 15, wherein a value equal to $c^{-1}$ modulo m is stored in a non-volatile portion of the memory, and the processing circuitry, in operation:

multiplies the stored value equal to $c^{-1}$ modulo m by the integer $S_A$ defining the private key, the multiplying the stored value equal to $c^{-1}$ modulo m by the integer $S_A$ generating the second scalar.

17. The device according to claim 15, wherein the integer $S_A$ is a multiple of the first scalar.

18. The device according to claim 12, wherein the second scalar is stored in a non-volatile portion of the memory.

19. The device according to claim 12, wherein the first scalar is a cofactor of the elliptic curve.

20. The device of claim 12, wherein the elliptic curve is:

an Edwards curve;

a Weierstrass curve; or a Montgomery curve.

21. The device of claim 12, comprising a cryptographic processor including the processing circuitry and the memory, wherein the memory comprises one or more memory registers.

22. A system, comprising:

a first processing device; and a second processing device communicatively coupled to the first processing device, wherein the first processing device, in operation:

multiplies a first public key received from the second processing device by a first scalar value, where the first public key corresponds to a point on an elliptic curve of order n, where n is an integer, and the first scalar value is equal to n/m where in is a largest prime integer factor of integer n, the multiplying of the first public key by the first scalar value generating an intermediate result;

determines whether the intermediate result is equal to a value corresponding to a point O at infinity on the elliptic curve; and in response to the determining indicating the intermediate result is different from the value corresponding to the point O at infinity on the elliptic curve:

multiplies the intermediate result by a second scalar, the multiplying the intermediate result by the second scalar generating a shared secret value; and performs one or more processing operations using the generated shared secret value.

23. The system according to claim 22, wherein the first processing device, in operation:
in response to the determining indicating the intermediate result is equal to the value corresponding to the point O at infinity on the elliptic curve, initiates error processing without generating the shared secret value.

24. The system according to claim 23, wherein:
the first processing device comprises a wireless communication interface;
the second processing device comprises a wireless communication interface;
the first processing device, in operation, is wirelessly coupled to the second processing device via a wireless communication link; and
the first processing device, in response to the determining indicating the intermediate result is equal to the value corresponding to the point O at infinity on the elliptic curve, terminates the wireless communication link.

25. The system of claim 22, wherein the one or more processing operations comprise an authentication operation to authenticate the second processing device.

26. A non-transitory computer-readable medium having contents which cause a first processing device to perform a method, the method comprising:
receiving, from a second processing device, a first public key, the first public key corresponding to a point on an elliptic curve of order n, where n is an integer;
multiplying the first public key by a first scalar value, where the first scalar value is equal to n/m and in is a largest prime integer factor of n, the multiplying of the first public key by the first scalar value generating an intermediate result;
determining whether the intermediate result is equal to a value corresponding to a point O at infinity on the elliptic curve; and
in response to the determining indicating the intermediate result is different from the value corresponding to the point O at infinity on the elliptic curve:
multiplying the intermediate result by a second scalar, the multiplying the intermediate result by the second scalar generating a shared secret value; and
performing one or more processing operations using the generated shared secret value.

27. The non-transitory computer-readable medium of claim 26, wherein the method comprises:
in response to the determining indicating the intermediate result is equal to the value corresponding to the point O at infinity on the elliptic curve, initiating error processing without generating the shared secret value.

28. The non-transitory computer-readable medium of claim 26, wherein the contents comprise instructions executed by processing circuitry of the first processing device.

* * * * *

UNITED STATES PATENT AND TRADEMARK OFFICE
CERTIFICATE OF CORRECTION

PATENT NO. : 12,381,729 B2
APPLICATION NO. : 18/184451
DATED : August 5, 2025
INVENTOR(S) : Thierry Simon et al.

Page 1 of 1

It is certified that error appears in the above-identified patent and that said Letters Patent is hereby corrected as shown below:

On the Title Page

Item (57) Abstract, Line 4:
"where in is" should read: -- where m is --.

In the Claims

Column 12, Claim 1, Line 65:
"and in is a" should read: -- and m is a --.

Column 13, Claim 6, Line 34:
"modulo in is stored" should read: -- modulo m is stored --.

Column 13, Claim 6, Line 36:
"modulo in by" should read: -- modulo m by --.

Column 13, Claim 6, Line 38:
"modulo in by" should read: -- modulo m by --.

Column 13, Claim 12, Line 58:
"where in is" should read: -- where m is --.

Column 14, Claim 22, Line 53:
"where in is" should read: -- where m is --.

Column 16, Claim 26, Line 2:
"and in is a" should read: -- and m is a --.

Signed and Sealed this
Eighteenth Day of November, 2025

John A. Squires
*Director of the United States Patent and Trademark Office*